(12) United States Patent
Trumbo et al.

(10) Patent No.: US 8,792,045 B2
(45) Date of Patent: Jul. 29, 2014

(54) VIDEO SURVEILLANCE CAMERA REFOCUS

(75) Inventors: Matt Trumbo, Fort Collins, CO (US); David K. Campbell, Loveland, CO (US)

(73) Assignee: Pelco, Inc., Clovis, CA (US)

( * ) Notice: Subject to any disclaimer, the term of this patent is extended or adjusted under 35 U.S.C. 154(b) by 320 days.

(21) Appl. No.: 12/896,761

(22) Filed: Oct. 1, 2010

(65) Prior Publication Data
US 2011/0080479 A1 Apr. 7, 2011

Related U.S. Application Data

(60) Provisional application No. 61/247,895, filed on Oct. 1, 2009.

(51) Int. Cl.
*H04N 5/232* (2006.01)

(52) U.S. Cl.
CPC .................... *H04N 5/23212* (2013.01)
USPC ............................................... 348/345

(58) Field of Classification Search
CPC ..................... H04N 5/232; H04N 5/23212
See application file for complete search history.

(56) References Cited

U.S. PATENT DOCUMENTS

| | | | |
|---|---|---|---|
| 5,742,340 A | 4/1998 | Alves | |
| 5,839,003 A | 11/1998 | Iwane | |
| 6,826,361 B1 | 11/2004 | Yost | |
| 7,450,838 B2 | 11/2008 | Nonaka | |
| 7,463,302 B2 * | 12/2008 | Kobayashi | 348/345 |
| 2004/0047622 A1 | 3/2004 | Holmes | |
| 2006/0098103 A1 * | 5/2006 | Park | 348/222.1 |
| 2007/0196091 A1 * | 8/2007 | Yamaguchi | 396/95 |
| 2008/0152334 A1 * | 6/2008 | Choi et al. | 396/97 |
| 2009/0109299 A1 | 4/2009 | Nishiguchi et al. | |

FOREIGN PATENT DOCUMENTS

JP       2003131106 A  *  5/2003  ............... G02B 7/02

* cited by examiner

*Primary Examiner* — Sath V Perungavoor
*Assistant Examiner* — Kate Luo
(74) *Attorney, Agent, or Firm* — Hamilton, Brook, Smith & Reynolds, P.C.

(57) ABSTRACT

A method of refocusing a video surveillance camera includes performing a first focusing operation of a camera at a first time, sensing a first temperature of the camera at the first time, sensing a second temperature of the camera at a second time, determining if a change in temperature between the first temperature and the second temperature is greater than a predetermined temperature change, sensing a level of light in a field of view of the camera at the second time, determining if the level of light sensed in the field of view of the camera at the second time is within a predetermined light level range, determining if a period of time between the first time and second time is greater than a predetermined period of time, and performing a focus operation if the change in temperature between the first temperature and the second temperature is greater than the predetermined temperature change, the level of light sensed in the field of view of the camera at the second time is within the predetermined light level range, and the period of time between the first and second time is greater than a predetermined period of time.

4 Claims, 3 Drawing Sheets

VIDEO SURVEILLANCE CAMERA REFOCUS

CROSS-REFERENCE TO RELATED APPLICATION

This application is related to and claims the benefit of U.S. Provisional Patent Application Ser. No. 61/247,895 filed Oct. 1, 2009, entitled METHOD AND APPARATUS FOR CORRECTING THE FOCUS OF A VIDEO SURVEILLANCE CAMERA, the entirety of which is incorporated herein by reference.

STATEMENT REGARDING FEDERALLY SPONSORED RESEARCH OR DEVELOPMENT

N/A

BACKGROUND

The present applicant pertains to video surveillance systems, and more particularly to adjusting the focus of a surveillance camera.

Temperature changes cause thermal expansion of materials and thermal changes in the index of refraction of glass. Various cameras make adjustments to keep the lens in focus whether the focus is changing due to temperature changes, scene changes, vibration or other reasons, and some cameras can be set up to continuously adjust and maintain focus. However, this continuous adjustment can result in many long periods of focus hunting in the video. These focus shifts can result in blurry and out-of-focus video which can be objectionable to users. In addition, this method of operation requires mechanisms designed for many millions of cycles of focus adjustment because of the continuous adjustments to focus. Accordingly, there has been a need in the art for a method that minimizes the frequency of refocusing and does not require a mechanism to be designed requiring millions of cycles of operation.

SUMMARY

An exemplary method of refocusing a video surveillance camera in accordance with the disclosure includes performing a first focusing operation of a camera at a first time, sensing a first temperature of the camera at the first time, sensing a second temperature of the camera at a second time, determining if a change in temperature between the first temperature and the second temperature is greater than a predetermined temperature change, sensing a level of light in a field of view of the camera at the second time, determining if the level of light sensed in the field of view of the camera at the second time is within a predetermined light level range, determining if a period of time between the first time and second time is greater than a predetermined period of time, and performing a focus operation if the change in temperature between the first temperature and the second temperature is greater than the predetermined temperature change, the level of light sensed in the field of view of the camera at the second time is within the predetermined light level range, and the period of time between the first and second time is greater than a predetermined period of time.

Embodiments of such a method may include one or more of the following features. The sensing a level of light in a field of view of the camera at the second time may include sensing a gain signal from an automatic gain control device. In addition, the method may include determining if the camera has changed from either a day mode of operation to a night mode of operation or night mode of operation to a day mode of operation and performing a focus operation if the camera has changed from either a day mode of operation to a night mode of operation or night mode of operation to a day mode of operation.

An exemplary video surveillance camera for refocusing the camera includes a lens, a device for performing a focusing operation on the camera, a temperature sensor for sensing the temperature of the camera, a device for sensing a level of light in the field of view of the lens, and a processor connected to the device for focusing the camera, the temperature sensor, and the device for sensing a level of light in the field of view of the lens. The processor is configured to receive a first temperature from the temperature sensor at a first time when the device for focusing the camera performs a first focus operation, to receive a second temperature at a second time from the temperature sensor, to determine if the temperature difference between the first temperature and the second temperature is greater than a predetermined temperature change, to receive a level of light sensed by the device for sensing a level of light in the field of view of the lens at the second time, to determine if the level of light sensed in the field of view of the camera at the second time is within a predetermined light level range, adapted to determine if a period of time between the first time and second time is greater than a predetermined period of time, and to cause the device for performing a focusing operation to perform a focus operation if the change in temperature between the first temperature and the second temperature is greater than the predetermined temperature change, the level of light sensed in the field of view of the lens at the second time is within the predetermined light level range, and the period of time between the first and second time is greater than a predetermined period of time.

Embodiments of such a video surveillance camera may include one or more of the following features. The device for sensing a level of light in a field of view of the lens may include an automatic gain control providing a gain signal. In addition, the video surveillance camera may include a mode changing device for changing an operation of the camera from a day mode of operation to a night mode of operation and for changing the operation from a night mode of operation to a day mode of operation and a mode change sensor for determining if the mode changing device has changed from either a day mode of operation to a night mode of operation or a night mode of operation to a day mode of operation. The mode change sensor is connected to the processor, and the processor is configured to cause the device for performing a focusing operation to perform a focus operation if the mode change sensor senses that the mode changing device has changed from either a day mode of operation to a night mode of operation or a night mode of operation to a day mode of operation.

Various embodiments discussed herein may provide one or more of the following capabilities. The refocusing method minimizes the number of times that the camera is refocused thereby reducing the amount of video from the camera that may be blurry due to focus adjustments. The refocusing method does not require a mechanical mechanism designed for continuous or frequent operation. Information from the temperature of the camera, the scene light level, day/night operation, and time since the last focus adjustment are utilized to determine if a refocus operation should be performed.

The methods and apparatus described herein, and the attendant advantages, applications, and features thereof will be

DETAILED DESCRIPTION

Figure 1:
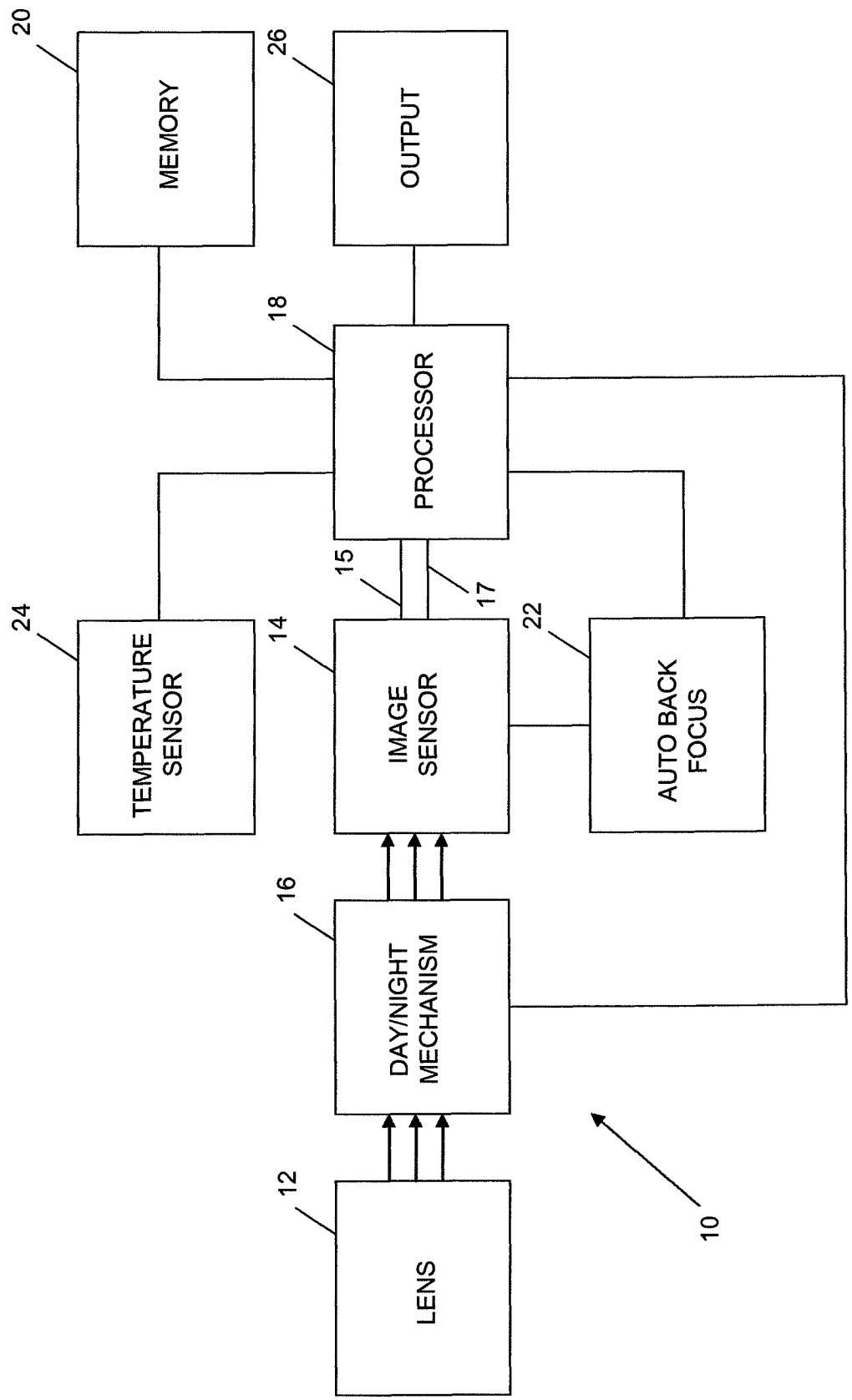
FIG. 1 is a block diagram of an embodiment of a video surveillance camera for controlling refocusing.

FIG. 1 illustrates an exemplary block diagram for a video surveillance camera 10 for controlling refocusing. Camera 10 can be, for example, a fixed surveillance camera, or a movable camera, such as a pan, tilt, and zoom (PTZ) surveillance camera. Camera 10 has a lens 12 which focuses the scene in its field of view on image sensor 14. Image sensor 14 can be, for example, a CMOS or CCD image sensor that is used to produce video from the camera and to determine the light level of the scene that the camera is viewing. Camera 10 can have a day/night mechanism 16 located between lens 12 and image sensor 14. Day/night mechanism 16 can be a motorized mechanism that removes and inserts an infrared cutoff optical filter in front of image sensor 14 to switch between day mode and night mode as is known in the art. Image sensor 14 is connected to processor 18 which has a memory 20. Processor 18 has an internal system clock which can be used to determine the time at which a function, such as a focus operation or refocusing, is performed.

The embodiment of camera 10, which is shown in FIG. 1, has an auto back focus mechanism 22 that is a motorized mechanism that adjusts the position of image sensor 14 in relation to lens 12 to adjust the focus, normally on the subject in the center of the scene, but other locations of the scene can be utilized. Alternatively, camera 10 could utilize a mechanism to move lens 12 in relation to image sensor 14 to adjust the focus. Camera 10 has a temperature sensor 24 to determine the temperature of camera 10. Day/night mechanism 16, auto back focus mechanism 22, and temperature sensor are connected to processor 18. The video output from camera 10 is provided to output 26 for viewing or recording and may be connected to a network. Image sensor 14 has an automatic gain circuit to electronically brighten a dark picture image viewed by lens 12 as is known in the art. Image sensor 14 generates image signals 15 to produce video from camera 10 at output 26 and gain level signals 17 from its automatic gain control circuit or device as an indication of the amount of light in the scene viewed by lens 12, that is, the light level. Gain level signals 17 are utilized as a sensor for the light level of the scene viewed by lens 12; however, other means can be used. The gain level signals are provided by image sensor 14 to processor 18 for use with algorithms.

Processor 18 controls camera 10 and implements the method and algorithms for refocusing camera 10 that can be stored, for example, in memory 20. Information from the temperature of the camera, the scene light level, day/night operation, and time since the last adjustment are utilized to determine if focus adjustment should be performed. The focus adjust system can be set to only run when a user has set camera 10 to an auto mode and has selected that temperature focuses be run. If desired, this can be the default state of camera operation. A temperature change of a predetermined number of degrees, such as an increase or decrease of 5 degrees C., has been found to produce a satisfactory tradeoff between the camera becoming defocused and the number of refocusing events performed. Processor 18 receives temperature information from temperature sensor 24. A lookup table can be established in memory 20 and modified as desired by a user to set the predetermined amount of temperature change to initiate a refocus event. If the temperature change exceeds the predetermined change amount, there may be a need to refocus camera 10. However, processor 18 considers a number of other factors before initiating a refocus. Processor 18 also considers: the length of time since the last refocus and the light level at the scene in the field of view of the camera. If processor 18 determines that a predetermined period of time, which can be set at camera setup or modified by a user, has passed since the last refocus, it may initiate a refocus. If the chance of focus success is deemed too low, processor 18 delays the refocusing operating until the conditions improve to the predetermined desired levels. The chance for success is determined by the amount of gain currently being used. The predetermined desired level or range of gain can be stored in a lookup table in memory 20. In general, the camera will provide a normal picture; however, when the amount of light in the field of view drops below a certain level the automatic gain control in image sensor 14 will begin to boost the detected image. The amplification boosts both the image in the scene as well as the background noise thereby degrading the quality of the image produced by camera 10 when the gain is not within a predetermined range. Processor 18 also causes a refocus when camera 10 changes from day mode to night mode or vice versa. Day/night mechanism 16 moves an infrared filter between lens 12 and imager 14 depending upon the mode of operation and can provide a signal to processor 18 indicating that the filter has been moved thereby indicating a mode change.

Figure 2:
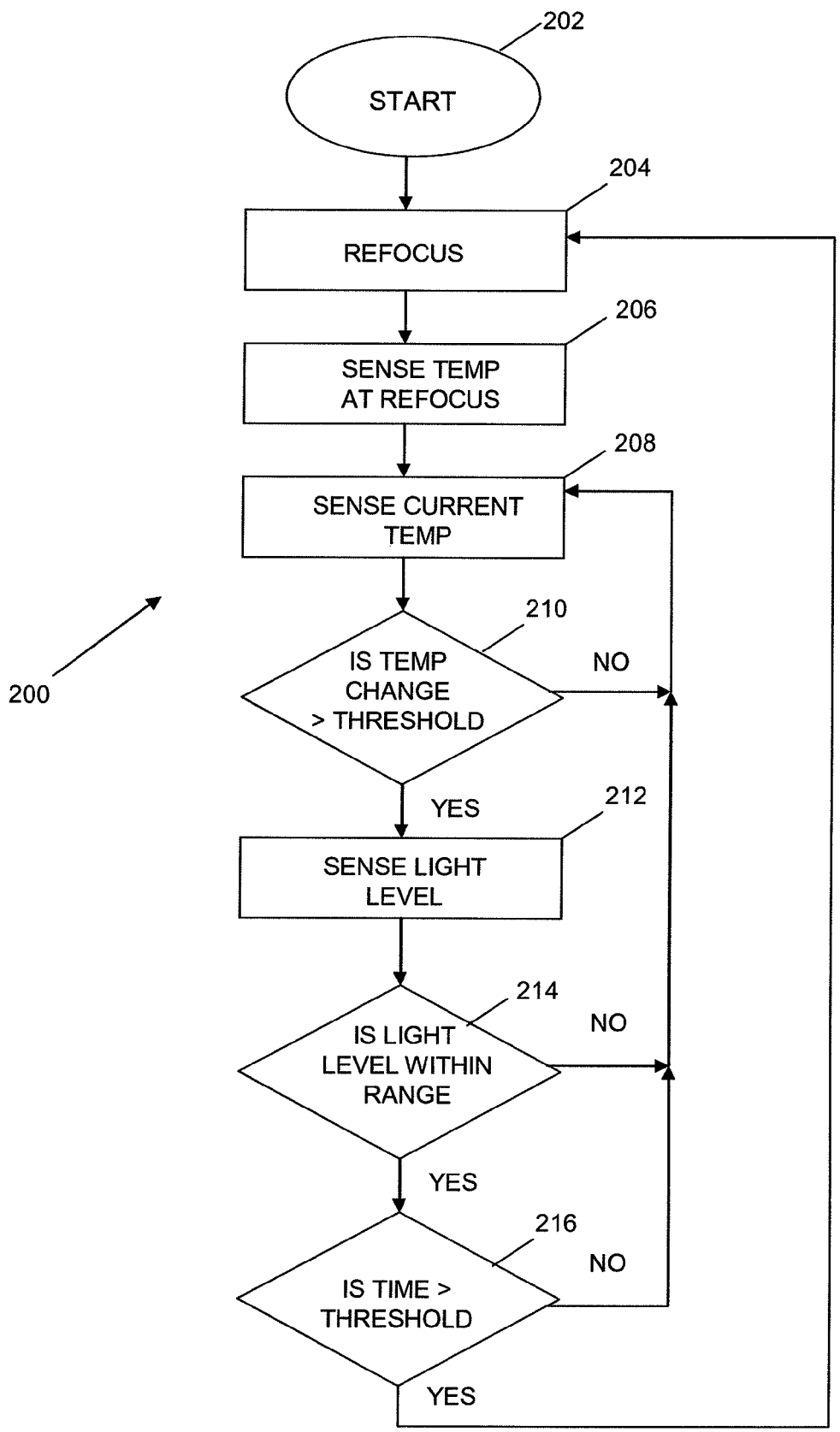
FIG. 2 is a flowchart illustrating an embodiment of a method of refocusing a video surveillance camera.

FIG. 2 illustrates a flowchart of one embodiment of a method of refocusing a video surveillance camera. Method 200 is implemented by processor 18 and begins at start 202. At block 204 processor 18 initiates a refocus operation at a first point in time; this refocus operation could be initiated by the method described in this embodiment or, for example, by a user. At block 206 processor 18 receives the temperature sensed by temperature sensor 24 at the first point in time and stores it in memory 20. At block 208 temperature sensor 24 detects the current temperature and provides a signal indicative thereof to processor 18. At decision point 210, processor 18 determines the temperature change from the first point in time at which the last refocus was performed by comparing the current temperature detected by temperature sensor 24 with the temperature stored in memory 20. If the change in temperature is greater than a predetermined change in temperature stored, for example, in memory 20 during setup of camera 10, then processor 18 proceeds to block 212 where the light level of the scene in the field of view of lens 12 is detected. If the change in temperature is not greater than the predetermined change in temperature, then the process returns to block 208. At block 212 the automatic gain control circuit of image sensor 14 provides a gain control signal 17 to processor 18 indicative of the current level of gain, which is an indication of the level of light in the scene in the field of view of lens 12. At decision point 214, processor 18 determines if the current light level is within predetermined thresholds or range; this step is performed by comparing gain control signal 17 with the predetermined range. If the light level is not within predetermined thresholds, then the process returns to block 208. If the light level is within predetermined range or thresholds, then the process proceeds to block 216 to determine if the time since the last focus is less than a predetermined threshold (period of time). If the time that has passed since the last focus is less than a predetermined period of time, then the process returns to block 208. If processor 18 determines at block 216 that the time from the last focus is greater than a predetermined period, then processor 18 proceeds to block 204 to trigger a refocusing of camera 10, and the process begins again.

Figure 3:
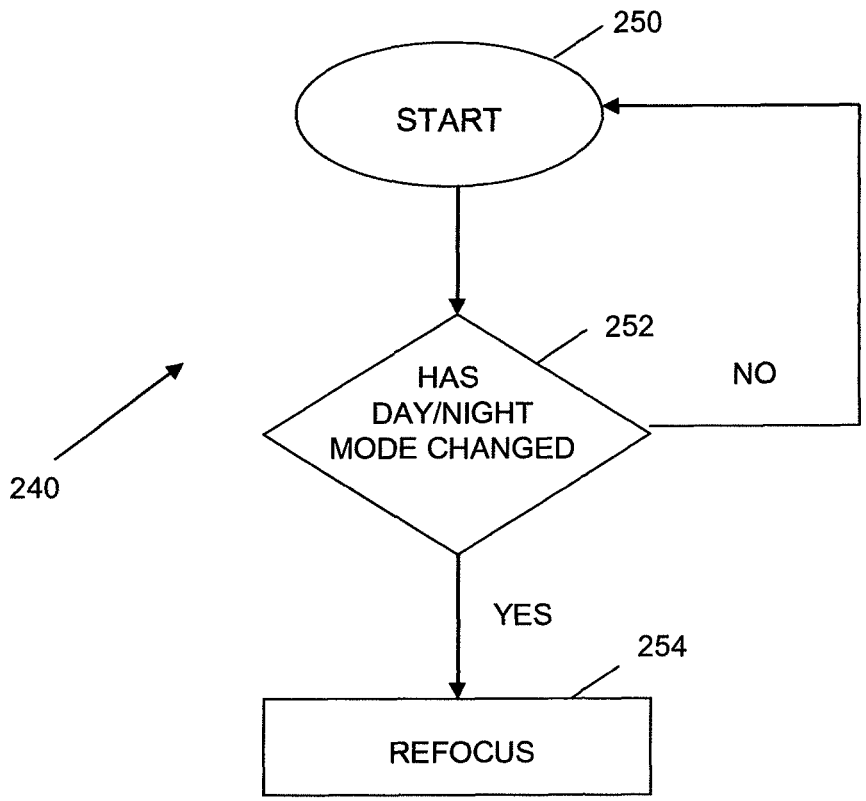
FIG. 3 is a flowchart illustrating an embodiment of a method of refocusing a video surveillance camera.

FIG. 3 illustrates an embodiment of a method for refocusing camera 10 when day/night mechanism 16 has been changed from day mode to night mode or vice versa. For example, processor 18 can receive a signal from day/night mechanism 16 when the motorized mechanism removes or inserts an infrared cutoff optical filter in front of image sensor 14 to switch between day mode and night mode as is known in the art. Method 240 is initiated at start 250 and proceeds to decision point 252 where processor 18 determines if day/night mechanism 16 has changed from day mode to night mode or vice versa. If yes, the process continues to block 254 where a refocus operation is performed. This method can be incorporated into the method illustrated in FIG. 2, but it has been shown separately in FIG. 3 for the sake of clarity.

It is to be understood that variations and modifications of the invention can be made without departing from the scope of the invention. It is also to be understood that the scope of the invention is not to be interpreted as limited to the specific embodiments disclosed herein, but only in accordance with the appended claims when read in light of the foregoing disclosure. In addition, it is to be understood that although the term invention has been used herein in its singular form, more than one invention may be described herein.

What is claimed is:

1. A method of refocusing a video surveillance camera comprising:

performing a first auto-focus operation of a camera at a first time; sensing a first temperature of the camera at the first time; sensing a second temperature of the camera at a second time; determining if a change in temperature between the first temperature and the second temperature is greater than a predetermined temperature change; sensing a level of light in a field of view of the camera at the second time; determining if the level of light sensed in the field of view of the camera at the second time is within a predetermined light level range; determining if a period of time between the first time and second time is greater than a predetermined period of time; and determining if the camera has changed from either a day mode of operation to a night mode of operation or a night mode of operation to a day mode of operation;

performing an auto-focus operation if the change in temperature between the first temperature and the second temperature is greater than the predetermined temperature change the level of light sensed in the field of view of the camera at the second time is within the predetermined light level range, and the period of time between the first and second time is greater than a predetermined period of time; and performing an auto-focus operation if the camera has changed from either a day mode of operation to a night mode of operation or a night mode of operation to a day mode of operation.

2. A method as recited in claim 1 wherein sensing the level of light in the field of view of the camera at the second time comprises sensing a gain signal from an automatic gain control device.

3. A video surveillance camera comprising:

a lens; a device for performing an auto-focus operation on the camera; a temperature sensor for sensing the temperature of the camera; a device for sensing a level of light in the field of view of the lens; a mode changing device for changing an operation of the camera from a day mode of operation to a night mode of operation and for changing the operation from a night mode of operation to a day mode of operation and a mode change sensor for determining if the mode changing device has changed from either a day mode of operation to a night mode of operation or a night mode of operation to a day mode of operation; and a processor connected to the device for performing an auto-focus operation, the temperature sensor, the device for sensing a level of light in the field of view of the lens, and the mode change sensor, the processor configured to:

receive a first temperature from the temperature sensor at a first time when the device for performing an auto-focus operation performs a first auto-focus operation, to receive a second temperature at a second time from the temperature sensor, to determine if the temperature difference between the first temperature and the second temperature is greater than a predetermined temperature change, to receive a level of light sensed by the device for sensing a level of light in the field of view of the lens at the second time, to determine if the level of light sensed in the field of view of the camera at the second time is within a predetermined light level range, adapted to determine if a period of time between the first time and second time is greater than a predetermined period of time, to cause the device for performing an auto-focusing operation to perform an auto focus operation if the change in temperature between the first temperature and the second temperature is greater than the predetermined temperature change, the level of light sensed in the field of view of the lens at the second time is within the predetermined light level range, and the period of time between the first and second time is greater than a predetermined period of time; and to cause the device for performing an auto-focus operation to perform an auto-focus operation if the mode change sensor senses that the mode changing device has changed from either a day mode of operation to a night mode of operation or a night mode of operation to a day mode of operation.

4. A video surveillance camera as recited in claim 3 wherein the device for sensing a level of light in a field of view of the lens comprises an automatic gain control providing a gain signal.

* * * * *